United States Patent
Wagner-Stürz

(10) Patent No.: US 12,480,599 B2
(45) Date of Patent: Nov. 25, 2025

(54) TESTING THE OPERABILITY OF A SAFETY VALVE FOR A SAFETY CASE

(71) Applicant: SAMSON AKTIENGESELLSCHAFT, Frankfurt am Main (DE)

(72) Inventor: David Wagner-Stürz, Mühltal (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 501 days.

(21) Appl. No.: 18/007,738

(22) PCT Filed: May 27, 2021

(86) PCT No.: PCT/EP2021/064246
§ 371 (c)(1),
(2) Date: Dec. 1, 2022

(87) PCT Pub. No.: WO2021/244945
PCT Pub. Date: Dec. 9, 2021

(65) Prior Publication Data
US 2023/0304603 A1     Sep. 28, 2023

(30) Foreign Application Priority Data

Jun. 2, 2020 (DE) ........................ DE102020114679

(51) Int. Cl.
*F16K 37/00* (2006.01)
*F16K 31/42* (2006.01)
(52) U.S. Cl.
CPC ........ *F16K 37/0083* (2013.01); *F16K 31/423* (2013.01)

(58) Field of Classification Search
CPC . G01M 13/00; F16K 37/0075; F16K 37/0083
See application file for complete search history.

(56) References Cited

U.S. PATENT DOCUMENTS

| 2006/0219299 A1 | 10/2006 | Snowbarger |
| 2010/0037966 A1* | 2/2010 | Braun ................ G05B 23/0256 137/553 |
| 2020/0124063 A1 | 4/2020 | Kobayashi et al. |

FOREIGN PATENT DOCUMENTS

| DE | 4218320 A1 | 12/1993 |
| DE | 19723650 A1 | 12/1998 |

(Continued)

OTHER PUBLICATIONS

Din En 61508.

Primary Examiner — Erika J. Villaluna
(74) Attorney, Agent, or Firm — GrowIP Law Group LLC

(57) ABSTRACT

Methods for testing the operability of a safety valve, as well as a solenoid valve for triggering a safety valve, and corresponding devices are proposed. The safety valve has a solenoid valve which is used to vent the pneumatic actuator in a safety case. Initially, a safety case is triggered. The position course of the valve member is recorded, and the time required until the safety position is reached is compared with a reference value. From this, it can be reliably concluded whether the assumption of the fail-safe position was caused by the solenoid valve or by the positioner. The measured values of pressure sensors can also be taken into account and allow further diagnostics to be carried out if operability is not assured. If the result of the test is positive, maintenance intervals can be optimized.

17 Claims, 5 Drawing Sheets

(56) References Cited

FOREIGN PATENT DOCUMENTS

| | | |
|---|---|---|
| DE | 10320031 A1 | 12/2004 |
| DE | 102010015647 A1 | 10/2011 |
| DE | 102018103324 B3 | 4/2019 |
| DE | 102018109865 A1 | 10/2019 |
| EP | 2473889 B1 | 11/2018 |
| WO | 2009013205 A1 | 1/2009 |
| WO | 2018075241 A1 | 4/2018 |
| WO | 2018075321 A1 | 4/2018 |

* cited by examiner

TESTING THE OPERABILITY OF A SAFETY VALVE FOR A SAFETY CASE

CROSS-REFERENCE TO RELATED APPLICATIONS

This application is a U.S. National Stage Application that claims the benefit of the filing date of International PCT Application No. PCT/EP2021/064246, filed May 27, 2021, that claims priority to German Patent Application No. DE102020114679, filed on Jun. 2, 2020, which are hereby incorporated by reference in their entirety.

TECHNICAL FIELD

The disclosure relates to a method for testing the operability of a safety valve, as well as a solenoid valve for triggering a safety valve, and a corresponding device. Such methods serve to ensure the operational safety of a plant by ensuring that a safety valve is triggered in the event of a safety situation.

Safety control valves or safety fittings usually consist of a pneumatic actuator and a valve element moving in the valve. They are used to regulate a fluid flow. The actuator stem of the valve member is usually guided to the outside by a fluid-tight housing or cover. A gasket seals the actuator stem to the outside. An actuator is located outside, which acts on the actuator stem and moves the valve member. Typically, fluidic actuators (usually pneumatic) serve as the drive to move the actuator stem. The type of valves can be either rotary valves or globe valves.

Safety valves have a safety circuit which ensures that the valve member moves to a safe position in the event of a safety situation. This safe position can be either the open position or the closed position. Since the pneumatic actuators are usually single-acting and therefore move to one of the positions by means of a spring mechanism, the actuator only needs to be vented so that it moves the valve element to the safe position.

A simple safety circuit has a solenoid valve for rapid venting of the actuator in a safety case. When the solenoid coil is de-energized, the armature of this solenoid valve moves by means of a spring to an open position, which connects the actuator of the safety valve to the atmosphere so that it can vent completely. Such solenoid valves usually have a very large passage so that the pressure can escape from the actuator of the safety valve as quickly as possible and the safety valve moves to the safe position as quickly as possible. The safety circuit is completely separated from all other circuits and must meet certain requirements, which are described, for example, in the SIL (Safety Integrity Level=safety requirement level) of the plant. The various SILs are defined in EN 61508.

Safety valves may also have a control function. In this case, they also have positioners in order to be able to regulate intermediate positions of the valve member. The control circuits for this are designed separately from those of the safety circuits. The positioners receive the switching signals from a control room and the compressed air supply is switched in such a way that the safety circuit is not affected in the event of a safety situation. The positioners are also used when the functionality of the safety circuit of safety valves is to be tested cyclically, for example by a partial stroke test. On/off control valves tend to stick if the valve member remains or is held in one position for a long time. The increased static friction often demands large forces from the actuator in such cases. With pneumatic actuators, therefore, a correspondingly higher pressure is required to tear or break loose the valve member against the static friction.

In the case of safety valves, the valve is often open during normal operation and closes automatically in a safety case (e.g. power failure). The compressed air always acts against the spring force with which the actuator was preloaded. If the actuator is vented, the valve starts to close as soon as the spring forces have released the valve member against the static friction, if any. The reverse case, where the fail-safe position is open (de-energized, actuator vented) and the operating position is closed (energized, actuator pressurized), also occurs.

BACKGROUND

In order to ensure the safe operation of a safety valve or safety fitting, in many cases it is tested after a certain time (e.g. cyclically or at fixed time intervals) whether the valve member can be moved fully into the safety position. Such a so-called full stroke test proves the full operability of a safety valve. However, in most cases it requires an interruption of the ongoing operation of a plant and is therefore usually associated with high effort and costs.

In order to be able to check the operability of a safety valve during operation without interrupting the work processes, so-called partial stroke tests (PST) are carried out. These are described, for example, in DE 197 23 650 A1, WO 2009/013205 A1 or DE 10 2018 103 324 B3. The valve member is moved only part of the way to the fail-safe position, in particular only to such an extent that the process of the plant is not significantly influenced or disturbed. Partial stroke tests can thus be carried out during operation. They allow conclusions to be drawn about the basic movability of the valve member and the actuator, at least within the scope of the stroke movement performed. Positioners are also required to perform such partial stroke tests. These positioners usually have a smaller passage for the actuator fluid than the solenoid valve. In addition, this passage can be regulated very sensitively, so that it is possible for the valve member also to travel only very small distances, as is required for a partial stroke test. To perform such fine movements, positioners with I/P converters are required, which must have an equally fine resolution displacement sensor system.

Another advantage of an intelligent safety valve with positioner compared to a safety valve with only a solenoid valve is that the position data and also pressure data can be recorded by means of the sensors, memory modules and processors of the positioner and, if required, statistically evaluated. This recording is important in order to provide evidence of the safe operation of the safety valve and its safety circuit. For the reasons mentioned above, a safety control valve often has both a solenoid valve and a positioner. In the event of a safety situation, however, it is not possible to determine with a high degree of certainty whether the solenoid valve or the positioner has caused the actuator to vent and thus the valve member to move to the safe position.

The operability of safety valves (e.g. in the chemical industry) must be checked regularly. In order to be able to guarantee the operability of a safety valve, both the solenoid valve, which is used to trigger the safety valve, and the actual safety valve must work reliably. Part of the process of checking the operability of a safety valve is performed by means of a partial stroke test (PST). In this test, the valve member is moved by approximately 10 to 15% of its possible stroke while the plant is running. This does not significantly affect the operation of the plant, but proves the mobility of the valve member. The most common faults can be excluded in this way. However, this test only determines the functionality of the valve members drive; a partial stroke test is not suitable for checking the function of a solenoid valve used to trigger the safety valve.

In the publication EP 2 473 889 B1 a valve system is described which has a valve actuator, a valve controller (positioner) and a safety solenoid valve. It also describes how a test (e.g. PST) is started and how diagnostic data, e.g. position data or pressure sensor signals, are output to indicate a status.

The publications WO 2018/075321 A1 and WO 2018/075241 A1 describe methods and devices for testing a solenoid valve using a positioner. The solenoid valve is used to trigger a safety valve.

In the publications mentioned, the functionalities of the solenoid valve and the positioner are described and methods are illustrated in which sensor data from a test of the control valve or the solenoid valve can be evaluated and output. However, the methods described cannot be used to conclude whether, after a safety case has occurred and the valve member has moved to the fail-safe position, the safety circuit with the solenoid valve or the positioner has caused the valve member to move to the fail-safe position. Such statements are important, however, because such a safety case could fulfill the role of an operational full-stroke test, and thus provide a statement about the operability of the solenoid valve. If such statements could be made reliably, the maintenance intervals of such a safety valve with safety circuit would be extended.

SUMMARY

Problem

It is the object of the disclosure to provide methods and devices which enable reliable statements to be made as to whether a safety valve and, in particular, the solenoid valve for triggering the safety valve have functioned properly when a safety event has occurred.

Solution

This problem is solved by the subject matter of the independent claims. Advantageous further embodiments of the objects of the independent claims are characterized in the sub-claims. The wording of all claims is hereby incorporated in this description by reference.

The use of the singular shall not exclude the plural, which shall also apply in the reverse sense, unless otherwise disclosed.

Individual method steps are described in more detail below. The steps need not necessarily be carried out in the order given, and the method to be described may also include further, unmentioned steps.

To solve the problem, a method for testing the operability of a solenoid valve of a safety valve is proposed. The safety valve has a valve member, and a single-acting pneumatic actuator with a drive fluid, as well as a positioner which sets the pressure in the drive fluid and thereby controls and/or regulates the position of the valve member. The valve member assumes a safety position when the pressure in the drive fluid equals an ambient pressure. The solenoid valve is pneumatically connected between the actuator and the positioner and is used to vent the actuator to ambient. In a safety case, both the solenoid valve and the positioner vent the actuator. The process comprises the following steps:

A safety case is triggered, as a result of which the valve member should move to its safety position.

The temporal progression of the position of the valve member after the safety case has been triggered is recorded.

The time interval required by the valve member to assume the safety position is determined.

The time interval is compared to a reference value.

If the time interval is longer than or equal to the reference value, the test of the operability of the solenoid valve is considered failed.

If the time interval is shorter than the reference value, the test of the operability of the solenoid valve is considered passed.

As a reference value, a time interval is specified which lies between the expected duration for assuming the safety position due to control by the positioner and the expected duration for assuming the safety position when the solenoid valve vents the actuator.

In this way, it can be determined without additional effort and with a high degree of certainty whether the valve member has moved to the safety position as a result of a safety case being triggered by the solenoid valve or by the positioner. With such a method, the maintenance intervals for plants with safety valves can be set up more optimally, if appropriate. In particular, the maintenance intervals may be extended if it has been proven that the solenoid valve has operated properly.

The accuracy of the diagnosis can be increased if the temporal progression of the velocity (i.e. the first derivative of the position) and/or the acceleration (the second derivative of the position) of the valve member is recorded after the safety case has been triggered. This recorded temporal progression of the velocity and/or the acceleration is compared with a previously stored reference characteristic curve. The test of the operability of the solenoid valve is considered passed if the recorded temporal progression of the velocity and/or the acceleration is above the reference characteristic curve by more than a predetermined amount. On the other hand, the test of the operability of the solenoid valve is considered failed if the recorded temporal progression of the velocity and/or acceleration is below the reference characteristic curve by more than a predetermined amount.

The preferred reference characteristic curve is a profile for the velocity and/or acceleration of the valve member, the profile of which lies between the velocity or acceleration profile to be expected when assuming the fail-safe position due to control by the positioner and the velocity or acceleration profile to be expected when assuming the fail-safe position when the solenoid valve vents the actuator.

In the rare situation in which the solenoid valve does not have a significantly larger passage than the positioner, a better distinction of the cases can be enabled by the positioner venting the actuator with a small, preset delay in the event of a safety case.

To solve the problem, a method for testing the operability of a safety valve in a safety case is also proposed. The safety valve has a valve member, and a single-acting pneumatic actuator with a drive fluid, as well as a positioner which sets the pressure in the drive fluid and thereby controls and/or regulates the position of the valve member. The valve member assumes a safety position when the pressure in the drive fluid equals an ambient pressure. A solenoid valve is pneumatically connected between the actuator and the positioner and is used to vent the actuator to ambient. A first pressure sensor is also provided to measure the pressure of the actuator fluid between the positioner and the solenoid valve. This first pressure sensor is usually integrated into the positioner. In a safety case, both the solenoid valve and the positioner vent the actuator. The procedure hereby comprises the following steps:

The safety case is triggered, as a result of which the valve member should move to its safety position.

The point in time at which the valve member has assumed the safety position is determined.

At this point in time, the first pressure sensor measures a residual pressure in the drive fluid.

If the residual pressure is higher than or equal to a first threshold, then the test of the operability of the safety valve is considered failed.

If the residual pressure is lower than the first threshold, then the test of the operability of the safety valve is considered passed.

In this method, the first pressure sensor measures the pressure between the positioner and the solenoid valve. If everything is working properly, the solenoid valve vents the actuator in a safety case. At the same time, the positioner controls or regulates such that the actuator is vented via the corresponding line. At the position where the pressure sensor measures the pressure, it is therefore only measured how the short and, in particular, small-volume line section from the positioner to the solenoid valve is vented. The pressure there thus quickly and, in particular, completely equalizes to the ambient pressure, and no residual pressure should be measured when the safety position is reached.

If, on the other hand, a residual pressure is measured which exceeds a first threshold, either the positioner or the solenoid valve has not operated correctly. The case of both not operating correctly is excluded by the fact that the valve member has assumed the safety position as a result of the safety case.

In this way, it can be determined without additional effort whether the safety valve has operated correctly or not as a result of the triggering of a safety case. With such a method, the maintenance intervals for plants with safety valves can be optimized, if appropriate. In particular, maintenance intervals may be extended if it has been proven that both the solenoid valve and the positioner have operated properly. If, for example, the operator of the plant knew that the valve was moved via the solenoid valve, he could consider the safety event that occurred as a functional test. This would provide evidence that the safety circuit is fully operable.

In one embodiment of the method, an output pressure prevails in the actuator of the safety valve before the safety case. The residual pressure is higher than or equal to the first threshold, so that the test of the operability of the safety valve is not passed. It is concluded that the solenoid valve is defective, if the residual pressure is lower than a second threshold, which is higher than the first threshold and lower than the output pressure, otherwise it is concluded that the positioner is defective.

For example, half of the residual pressure typically measured at the first pressure sensor when the valve member is moved to the safety position by the positioner can be used as the first threshold. This can be determined as part of a calibration measurement when setting up the plant. During such a calibration, the actuator is vented through the positioner and the solenoid valve remains in the operating position and does not vent. The entire air volume of the actuator and the supply lines therefore escapes through these supply lines and the positioner, which usually has a significantly lower passage than the solenoid valve. Therefore, when the safety position is assumed, there is still a residual pressure at the first pressure sensor.

As a second threshold, a pressure can be selected that, for example, lies midway between the typical residual pressure described and the initial pressure.

If the first pressure sensor measures a residual pressure that is above this second threshold, i.e. essentially corresponds to the output pressure, there is a defect in the positioner, since the line section where the first pressure sensor is located is not properly vented. However, the solenoid valve has operated since the safety position has been reached. If, on the other hand, the residual pressure is between the two thresholds, the actuator has been vented via the positioner, from which it can be seen that the positioner, but not the solenoid valve, has operated properly.

This embodiment of the method thus enables a more precise statement about the cause of the malfunction in the event of a fault.

An even more detailed diagnosis is possible if a progression of the position of the valve member and/or the pressure is recorded, whereby a position and/or pressure and/or position-pressure characteristic curve can be formed, and if the characteristic curve obtained is compared with at least one stored reference characteristic curve. In this way, deviations from normal behavior can be detected before they have a fundamental effect on the operability of the safety valve or its components.

A more detailed diagnosis can also be achieved by recording the temporal progression of the pressure and/or a first and/or second derivative thereof after the safety case has been triggered, and by comparing the recorded temporal progression of the pressure and/or the first and/or second derivative thereof with a previously stored reference characteristic curve.

Preferably, statements about the operability of components of the safety valve are obtained from the comparison of the recorded progression and/or the at least one obtained characteristic curve with the at least one reference characteristic curve. The different cases can be distinguished more easily, if necessary, since not only individual values are taken into account, but also the shape of the characteristic curves obtained.

Correct operation of the solenoid valve can be concluded if a very fast or even abrupt pressure drop of the first pressure sensor and at the same time a slower, continuous position change have been detected.

This can be done as follows: A first time interval is determined which the pressure measured at the first pressure sensor requires to drop to atmospheric pressure. Furthermore, a second time interval is determined which the valve member requires to move to the safety position. The times are measured from the triggering of the safety case. Correct operation of the solenoid valve is inferred if the first time interval is shorter than the second time interval, since then the actuator is exhausted via the solenoid valve, and the control line between the positioner and the solenoid valve is exhausted via the positioner, which usually happens very quickly.

On the other hand, a defect of the solenoid valve can be concluded if the first time interval is longer than the second time interval.

A defect of the positioner can be concluded if a constant pressure curve at the first pressure sensor and simultaneously a continuous position curve of the valve member towards the safety position have been detected.

The behavior of the safety valve can be evaluated even more precisely and in greater detail if a second pressure sensor is provided which measures the pressure of the drive fluid between the solenoid valve and the actuator of the safety valve. Then, a rapid, abrupt drop in pressure at the first pressure sensor and, at the same time, a continuous drop in pressure at the second pressure sensor can be used to conclude that the components of the safety valve are functioning correctly. For such a diagnosis, it is generally sufficient if the pressure drop at the first pressure sensor is faster than the pressure drop at the second pressure sensor.

If a second pressure sensor is provided which measures the pressure of the drive fluid between the solenoid valve and the actuator of the safety valve, a defect of the actuator of the safety valve can be concluded from a rapid, abrupt pressure drop of the first pressure sensor and simultaneously a continuous pressure drop at the second pressure sensor and a position course deviating from a reference position characteristic. In particular, a defect in the actuator of the safety valve is concluded if the pressure drop at the first pressure sensor is faster than the pressure drop at the second pressure sensor and the change in the position of the valve member over time deviates from a reference position characteristic. With the observed pressure curves, the valve member should move to the safety position in the expected time; if there are delays, a mechanical problem in the vicinity of the actuator of the valve member is to be assumed.

The problem is further solved in that in a method as described above, the method steps are formulated as program code with which the method can run on at least one computer.

The problem is further solved by a positioner of a safety valve having means for data recording as well as a controller, which are embodied such that the positioner is able to check the operability of the safety valve and/or the solenoid valve with the aid of a method as described above.

In addition, the problem is solved by a safety valve having such a positioner.

The problem is also solved by a process plant having such a safety valve.

Furthermore, the problem is solved by a computer program comprising instructions which cause said positioner to execute the method steps according to one of the methods described above.

Furthermore, the problem is solved by a computer-readable medium on which said computer program is stored.

BRIEF DESCRIPTION OF THE DRAWINGS

Further details and features result from the following description of preferred embodiments in connection with the figures. The respective features may be implemented individually or in combination with one another. The possibilities for solving the problem are not limited to the embodiments. For example, range specifications always include all—unmentioned—intermediate values and all conceivable subintervals.

The embodiments are shown schematically in the figures. Identical reference numerals in individual figures designate identical or functionally identical elements or elements that correspond to one another in terms of their functions. In detail.

DETAILED DESCRIPTION

Figure 1:
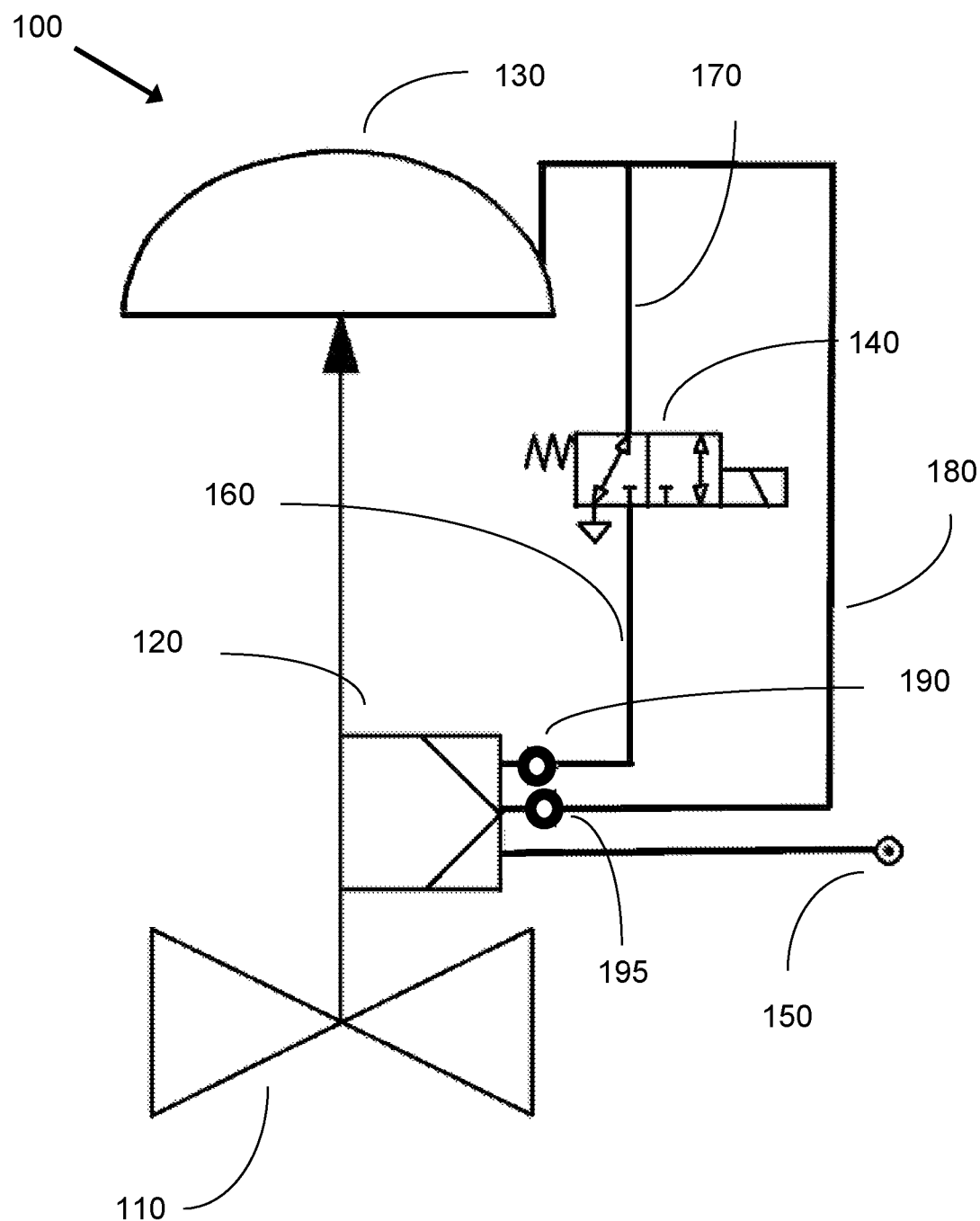
FIG. 1 shows a schematic representation of a safety valve with solenoid valve and positioner, in which a method according to the disclosure can be used.

FIG. 1 shows the schematic structure of a typical safety valve 100. This includes the actual valve 110 with the valve member, a positioner 120 and a pneumatic actuator 130 that operates the valve member. The pressure conditions in the actuator are controlled by the solenoid valve 140 and the positioner 120. Compressed air is supplied to the positioner through a supply line 150.

The solenoid valve is energized during normal operation (power supply is not shown). If the power supply to the solenoid valve 140 is interrupted, it switches to its fail-safe position and opens a connection from the actuator to the atmosphere, causing the pressure in the actuator to drop to ambient pressure and the valve 110 to move to the fail-safe position.

This condition can be seen in the schematic diagram of FIG. 1: the left valve position is active, in which the control line 160, 170 between the positioner 120 and actuator 130 is interrupted and instead a connection of the actuator to the atmosphere is switched, indicated by the arrow at the bottom left of the solenoid valve 140. If the solenoid valve 140 were in its operating position, the right half would be active, which opens the control line 160, 170 between the positioner 120 and actuator 130.

In the illustrated embodiment, when the solenoid valve is in the fail-safe position, the control line 160 extending from the positioner 120 to the solenoid valve 140 is blocked in the solenoid valve (indicated by the 'T'-shaped representation).

The positioner 120 is mounted on the safety valve 100 and controls the stroke position of the valve member and the pressure in the actuator. The actuator 130 is connected to the positioner 120 via the control connection line 160, 170. A first pressure sensor 190 is located at the connection of this line to the positioner, which in particular measures the pressure in the section 160 of the control line between the positioner 120 and the solenoid valve 140. Between the solenoid valve 140 and the actuator 130, the pressure is further fed via the measuring line 180 to the measuring connection of the positioner 120 with the second pressure sensor 195. The latter thus measures in particular the pressure in the section 170 of the control line between the solenoid valve 140 and the actuator 130, and thus the pressure in the actuator.

Depending on the specific application, the positioner 120 is responsible for the safety valve 100 for control operation and/or for diagnostic functionalities (e.g. for partial stroke tests). The solenoid valve 140 takes over the actual safety function. For this reason, it usually has a larger Kvs value than the positioner, since higher demands are placed on the operating times (emergency reaction time, i.e. how quickly the valve member reaches the safety position in the event of a safety case). Shorter venting times and thus faster movements of the valve member 110 are therefore required.

If a safety event occurs in the plant, both the positioner 120 and the solenoid valve 140 no longer receive a current signal or receive a significantly lower current signal than for normal operation (typically 0 V voltage is then present at the solenoid valve and the positioner is still supplied with 3.75 mA). As a result, both components switch so that the actuator 130 is vented.

Without pressure sensors 190, 195, i.e. only by means of the position detection of the positioner 120, a verification of operability for the solenoid valve 140 is possible via the time required to assume the fail-safe position. This can be seen in the stroke-time curves from the diagram in FIG. 2. Since the solenoid valve 140 generally has a significantly larger Kvs value, i.e. a significantly higher maximum flow rate, than the positioner 120, the actuator 130 vents much faster via the solenoid valve 140 than via the positioner 120.

Figure 2:
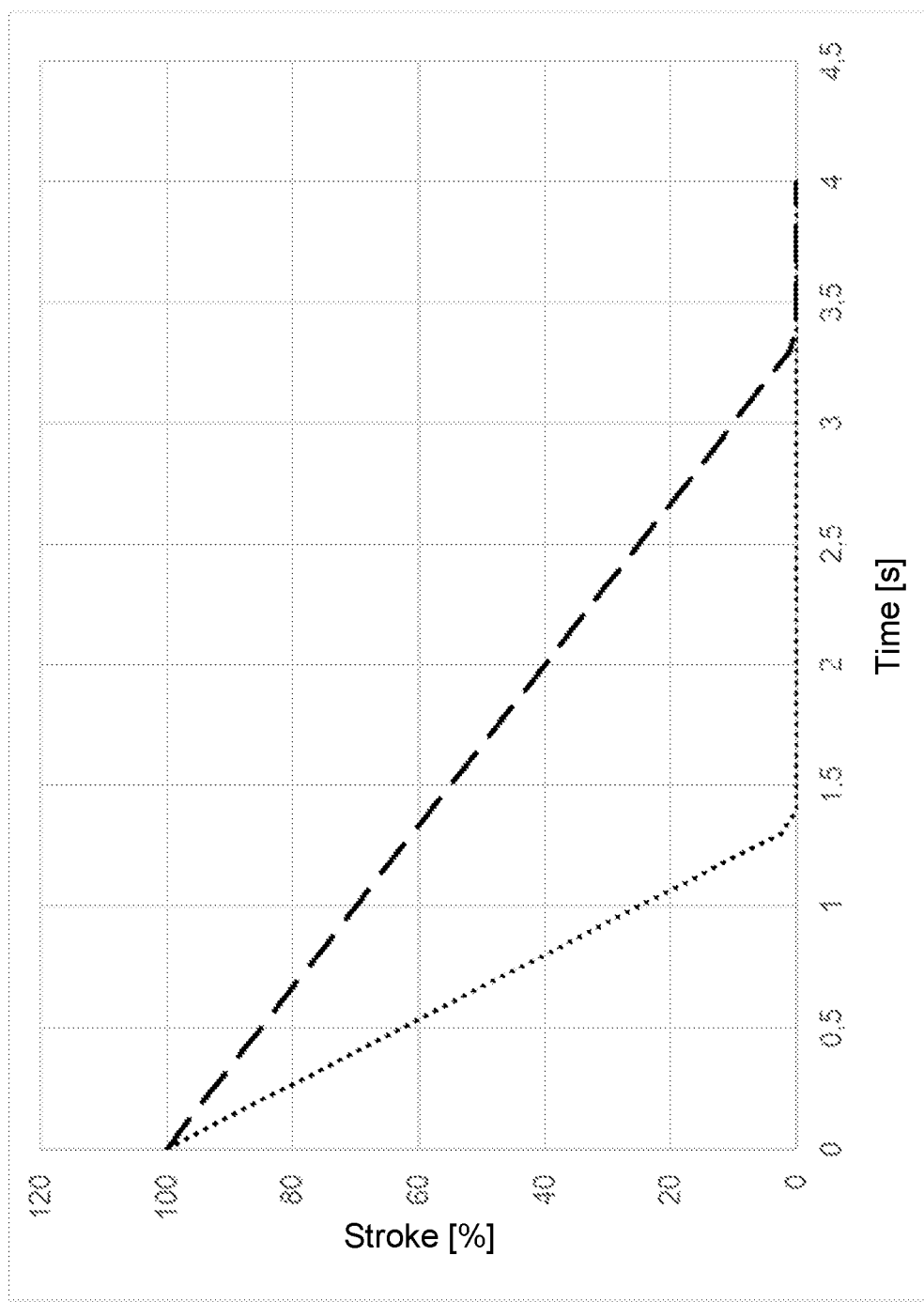
FIG. 2 shows a diagram showing the valve stroke over time in the safety case, both when the solenoid valve has switched and when the positioner has caused the valve to assume the fail-safe position.

This results in the curves shown in FIG. 2: The dashed curve indicates the stroke-time curve that occurs when the positioner moves the valve member to the fail-safe position, while the dotted curve indicates the stroke-time curve that occurs when the solenoid valve exhausts the actuator. The time difference can be used to determine whether the positioner or the solenoid valve has moved the valve member to the fail-safe position in the event of a safety situation. In this case, the curve for the positioner can be determined as part of a calibration measurement and stored as a reference curve. The typical time duration for this process can also be determined in this way. For diagnostic purposes, however, it is more convenient to determine a reference value that lies between the expected times for moving the valve member by means of the positioner and by means of the solenoid valve. A case distinction can then be made on the basis of a comparison with this reference value.

In the case of increased safety requirements, for example, the expected maximum duration for the process using the solenoid valve can also be selected as a reference value. In the situation shown in FIG. 2, this would be 1.5 seconds, for example.

Figure 3:
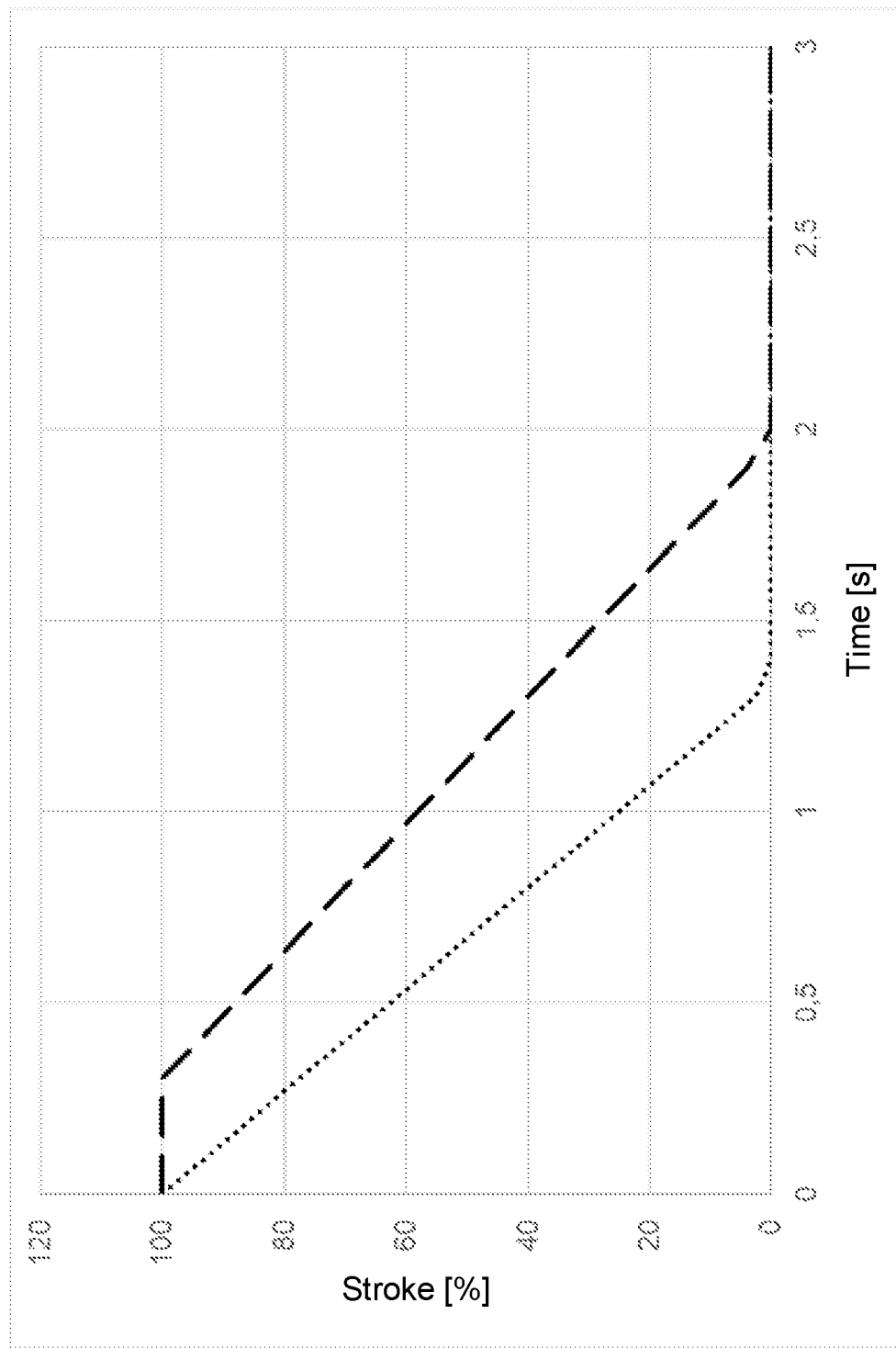
FIG. 3 shows a diagram showing the valve stroke over time in the safety case when there is an additional delay that allows differentiation at similar flows.

For the less common case in which the positioner 120 and solenoid valve 140 have similar Kvs values, the distinction just described would be difficult to make because the curves in FIG. 2 would be very close. In this situation, it is advantageous if the position controller 120 is configured to switch with a small delay (of 0.3 s, for example). This situation is shown in the diagram of FIG. 3. As in FIG. 2, the dashed curve represents the stroke progression that occurs when the positioner moves the valve member to the fail-safe position.

The dotted curve again represents the stroke curve that occurs when the solenoid valve exhausts the actuator. Due to the delay, the stroke-time curves are again further apart. In particular, there is a time difference for the possible venting processes that is at least equal to the selected delay. Therefore, due to the inserted delay, it is possible to keep the two cases apart as described.

If a first pressure sensor 190 is present, which measures the pressure in the control line 160 between the positioner 120 and the solenoid valve 140, more differentiated statements can be made as to whether the safety valve 100 has functioned properly in a safety case. In particular, statements can be made about which components may not have functioned.

In trouble-free operation, the compressed air from the positioner 120 passes through the control line 160, the solenoid valve 140 and the control line 170 into the actuator 130. In this case, the solenoid valve is switched to through (energized). In this situation, the stroke position of the valve member 110 is adjusted by means of the positioner 120. To adjust the position, the positioner has a position measuring system which records the position of the valve member.

If a safety event occurs, the current supply to the solenoid valve 140 fails. The solenoid valve then switches by means of spring bias to a position in which the line 160 from the positioner to the solenoid valve is blocked and the control line 170 is vented to ambient pressure in the manner already described. At the same time, the positioner is switched so that it also vents, which also vents line 160 between the positioner and the solenoid valve. In this state, the actuator 130 now moves the valve member to the fail-safe position. If the solenoid valve were defective and would not vent, the control line 170 between actuator 130 and positioner 120 would not be interrupted. The actuator would therefore be vented via the positioner.

Figure 4:
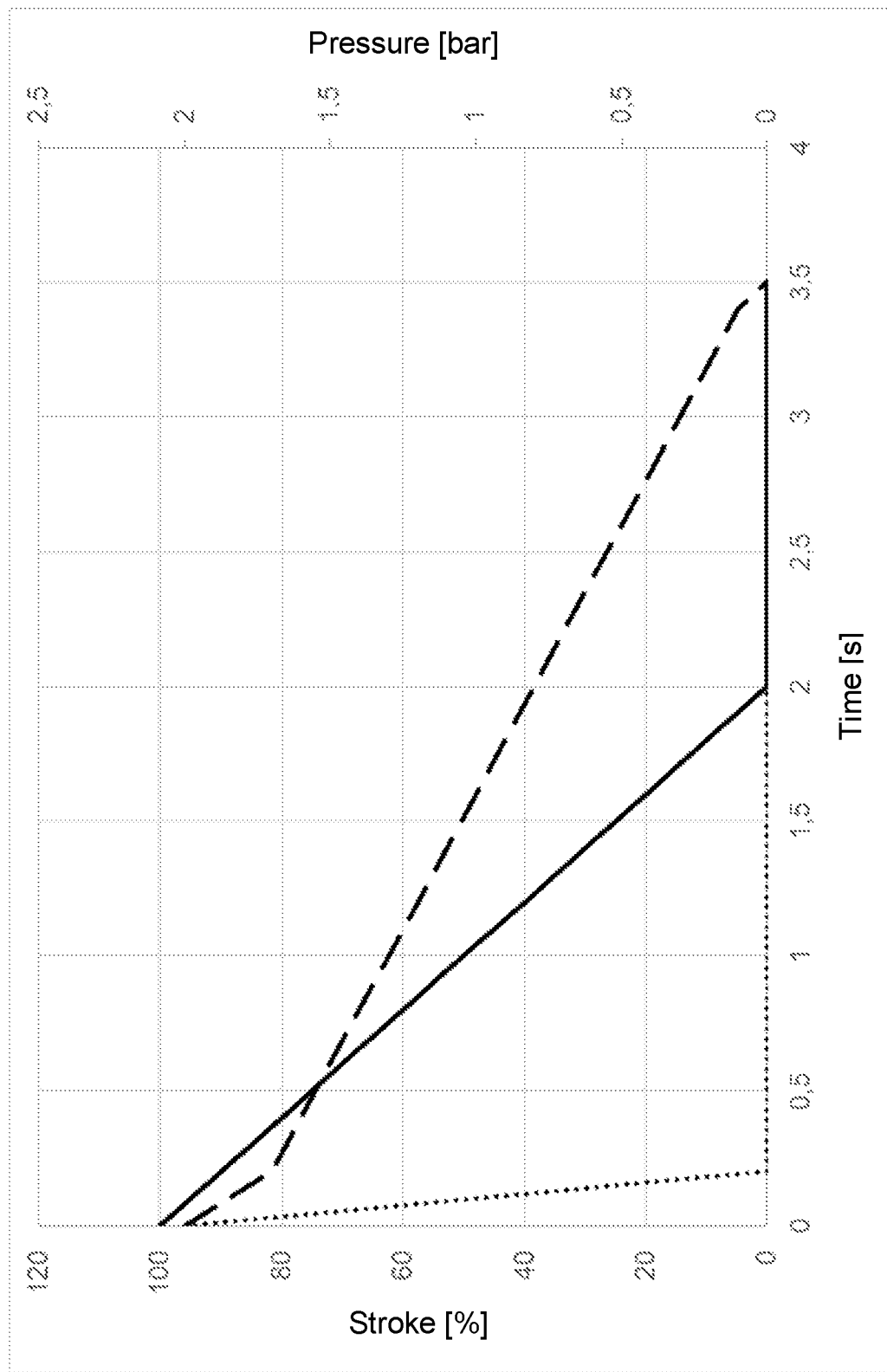
FIG. 4 shows a diagram showing, in addition to the stroke curve, the pressure curve at the first pressure sensor in the safety case.

In FIG. 4, a diagram can be seen which shows the pressure curve at the first pressure sensor 190 in addition to the position curve of the valve member 110 in the safety case (solid curve) for the case in which the solenoid valve switched properly (dotted curve) and for the case in which the solenoid valve did not function and the positioner vented the actuator (dashed curve).

The differences are explained as follows: Once the solenoid valve has switched correctly, the control line 160, 170 is interrupted at the solenoid valve and vented. The short and thus small-volume line section 160 between the solenoid valve 140 and the positioner 120 is also vented (by the positioner), and very quickly because of its small volume. This leads to the very steeply sloping dotted curve in FIG. 4. If the solenoid valve has not switched correctly, the venting of the actuator 130 takes place via the positioner 120. Due to the large volume and the generally lower Kvs value, the pressure drop at the first pressure sensor 190 takes place much more slowly in this case, in a manner that correlates with the movement of the valve actuator 130. This is shown in FIG. 4 by the dashed curve. A differential pressure is set at the beginning of the process via a throttle point at the positioner, which causes the kink in the initial course of the curve.

Figure 5:
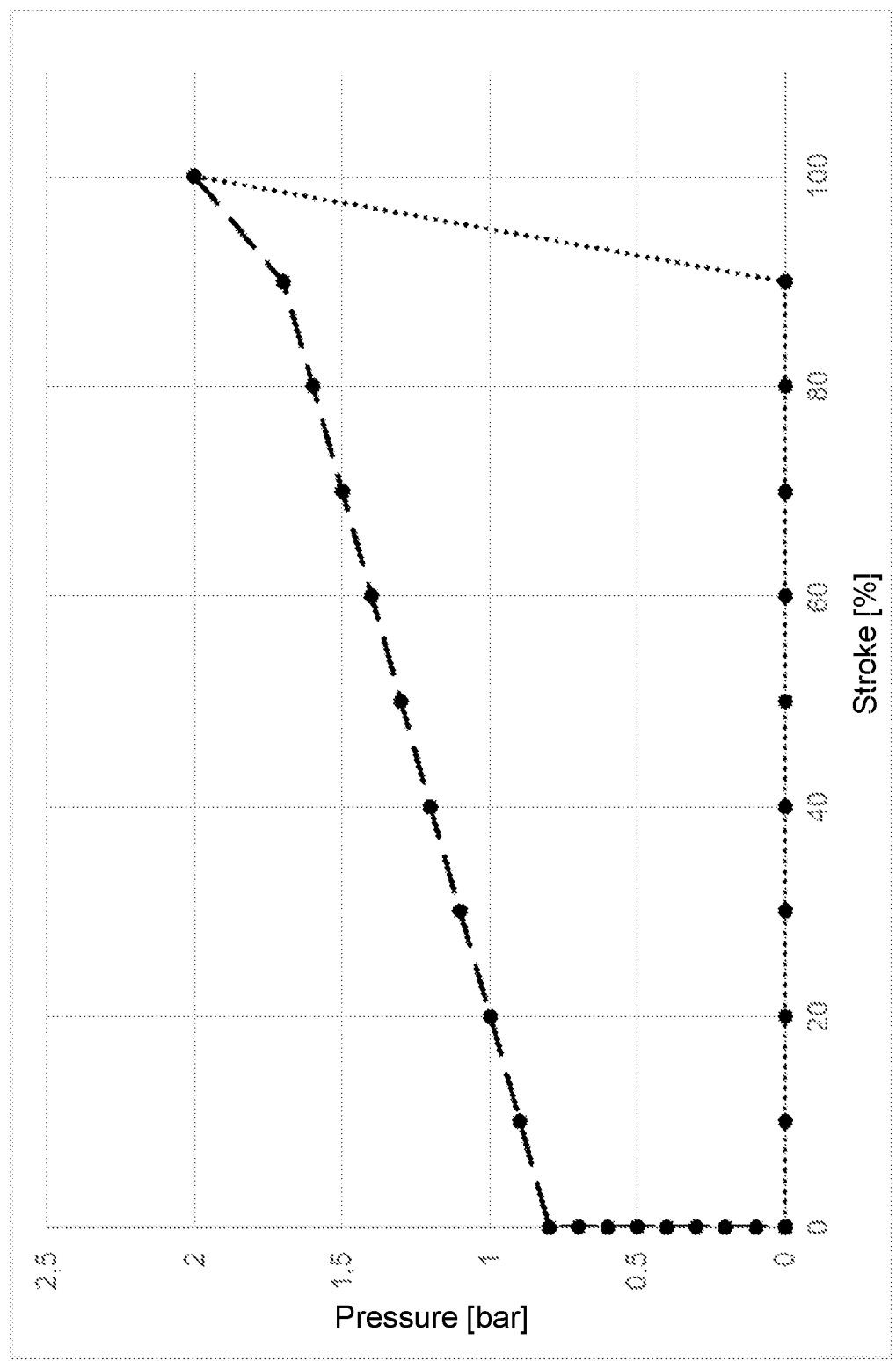
FIG. 5 shows a diagram showing the associated stroke-pressure characteristics obtained in the safety case.

The stroke-pressure curves corresponding to the situation in FIG. 4 are shown in FIG. 5. Here again, the dotted curve applies to the case where the solenoid valve has vented the actuator, while the dashed curve applies to the case where venting took place via the positioner. These curves make it easy to distinguish between the above cases. In particular, the residual pressure observed when the stroke position 0 is reached provides a favorable distinguishing criterion. Here, for example, a first threshold can be selected which lies between the expected residual pressure when the actuator moves to the fail-safe position by means of the positioner and 0.

The third possible case, where the solenoid valve has operated properly but the positioner has not, is not shown. In this case, the valve would move to the fail-safe position, but the pressure at the first pressure sensor 190 would still correspond to the output pressure, since the corresponding line section 160 at the solenoid valve 140 would be blocked and not vented by the positioner. As a distinguishing criterion, a second threshold would be useful here, which lies between the output pressure and the expected residual pressure when the actuator is moved by means of the positioner.

The diagnosis becomes even more reliable if a second pressure sensor 195 is present, which measures the pressure in the actuator 130 or in the section 170 of the control line between the solenoid valve 140 and the actuator 130 by means of the measuring line 180. If the first pressure sensor 190 provides a very rapid, abrupt pressure drop and the second pressure sensor 195 provides a continuous drop, then all components have operated as intended. The two sensors then provide completely different temporal progressions.

If, on the other hand, the two pressure drop curves are similar, with a smoother, in particular not abrupt, progression, it is to be assumed that the solenoid valve 140 is defective and the positioner 120 is operable. The actuator is vented via the positioner, so both pressure sensors 190, 195 measure approximately the same values.

The totality of all possibilities when using two pressure sensors and a typical safety valve is shown in the following table.

|  | P1 drops very rapidly | P1 drops slowly | P1 remains constant |
|---|---|---|---|
| P2 drops rapidly | solenoid valve operable positioner operable | N/A | solenoid valve operable positioner defective |
| P2 drops slowly | N/A | P1 and P2 always remain equal during pressure drop solenoid valve defective positioner operable | N/A |
| P2 remains constant | The solenoid valve has switched, but the now switched venting line of the actuator is clogged. positioner operable | N/A | solenoid valve defective positioner defective |

(Wherein
P1 denotes the pressure measured at the first pressure sensor 190
P2 denotes the pressure measured at the second pressure sensor 195.)

Should the position of the valve member now change too slowly or not at all, although the pressure sensors 190, 195 show the expected curve characteristics, an increased friction or blockage of the valve actuator 130, in particular of the actuating mechanism, or a defect of the position sensor can be concluded.

Glossary

Fluidic Drive of a Valve

A valve is referred to as fluidically driven or actuated if the actuator stem of the valve is moved by a diaphragm which is pressurized by a fluid, typically compressed air, and is thus positioned.

Kv Value, Kvs Value

The Kv value is also referred to as the flow factor or flow coefficient. It is a measure of the achievable flow rate of a liquid or gas through a valve at a given degree of opening and is used for selecting and dimensioning valves. The value is given in the unit m$^3$/h and can be interpreted as an effective cross-section. A Kv value is only valid for an associated stroke or opening degree of a valve. The Kv value of a valve at nominal stroke (i.e. 100% opening degree) is called Kvs value. The Kvs value can be used to determine the maximum possible flow rate for a valve (according to https://de.wikipedia.org/wiki/Kv-Wert).

Solenoid Valve

A solenoid valve is a valve with an electromagnetic drive or actuator. Depending on their design, solenoid valves can switch very quickly.

Safety Valve

Safety valves are control valves with an open/close mode of operation and safety-relevant application. Control valves consist of a—typically fluidic—actuator and a movable valve member and are used to regulate a fluid flow. The type of valves can be either rotary valves or globe valves. In the field of safety-relevant valves, single-acting pneumatic actuators are usually used. The actuators, which are preloaded on one side by spring forces, independently move into a safe position when the actuator is vented, i.e. when the compressed air escapes from the chamber of the actuator. This happens, for example, when a current/pressure (I/P) transducer or a solenoid valve is no longer energized.

In the case of safety valves, the safety valve is often open during normal operation, and in the event of a safety case (e.g. power failure), the safety valve closes independently. The compressed air always acts against the spring force. If the actuator is vented, the valve starts to close as the spring forces are released. The safety position can also be de-energized open (actuator vented) and energized closed (actuator pressurized). In the safety position, therefore, only the ambient pressure is present in the actuator.

Partial Stroke Test, PST

To ensure the safe operation of a valve, it is tested regularly or cyclically whether the valve member also moves. For these tests, it is not desired that the valve moves completely to the safety position in order not to disturb the running operation. In a partial stroke test, the valve member is moved only as far as necessary to ensure that the valve member moves part of the distance without significantly affecting the process of the plant. This also determines whether the valve member still disengages from its position or breaks free. After the partial stroke test, the valve member returns to its initial position. This test can be used to check the basic movability of the valve member.

Valve Member

The valve member is the element that closes the valve when it is pressed onto the valve seat.

REFERENCE NUMERALS

100 safety valve
    110 actual valve; valve body with valve member
    120 positioner
    130 valve actuator
    140 solenoid valve
    150 compressed air source
    160 control line between positioner and solenoid valve
    170 control line between solenoid valve and actuator
    180 measuring line 190 first pressure sensor
195 second pressure sensor

The invention claimed is:

1. A method for testing the operability of a solenoid valve of a safety valve having a valve member;
  wherein the safety valve has a single-acting pneumatic actuator with a drive fluid for positioning the valve member;
  wherein the safety valve has a positioner which adjusts the pressure in the drive fluid and thereby controls and/or regulates a position of the valve member;
  wherein the valve member assumes a safety position when the pressure in the drive fluid corresponds to an ambient pressure;
  wherein the solenoid valve is pneumatically connected between the actuator and the positioner and is used to vent the actuator to ambient;
  wherein, in the event of a safety case, both the solenoid valve and the positioner vent the actuator to ambient;
  wherein the method comprises the following steps:
    triggering the safety case, as a result of which the valve member is intended to move to the safety position;
    recording the temporal progression of the position and a velocity and/or an acceleration of the valve member after the safety case has been triggered;
    determining the time interval needed for the valve member to assume the safety position;
    comparing the time interval to a reference value and comparing he recorded temporal progression of the velocity and/or the acceleration to a previously stored reference characteristic curve;
    if the time interval is longer than or equal to the reference value or if the recorded temporal progression of the velocity and/or the acceleration runs below the reference characteristic curve by more than ed amount, then considering the test of the operability of the solenoid valve failed;
    if the time interval is shorter than the reference value or if the recorded temporal progression of the velocity and/or the acceleration runs above the reference characteristic by more than a predetermined amount, then considering the test of the operability of the solenoid valve passed.

2. The method according to claim 1, the method further comprising: in the event of a safety case, venting the actuator, via the positioner, with a predetermined delay.

3. The method according to claim 1, wherein the method steps are formulated as program code with which the method can run on at least one computer.

4. A method for testing the operability of a safety valve in a safety case;
  wherein the safety valve has a valve member and, for positioning the valve member, a single-acting pneumatic actuator with a drive fluid;
    wherein the safety valve has a positioner which adjusts the pressure in the drive fluid and thereby controls and/or regulates a position of the valve member;
    wherein the valve member assumes a safety position when the pressure in the drive fluid corresponds to an ambient pressure;
      wherein a solenoid valve is pneumatically connected between the actuator and the positioner and is used to vent the actuator to ambient;
      wherein a first pressure sensor is provided that measures the pressure of the drive fluid between the positioner and the solenoid valve;
    wherein, in the event of a safety case, both the solenoid valve and the positioner vent the actuator to ambient;
  wherein the method comprises the following steps:
    triggering the safety case, as a result of which the valve member is intended to move to the safety position;
    determining the point in time at which the valve member has assumed the safety position;
    at this point in time, measuring, via the first pressure sensor, a residual pressure in the drive fluid;
    if the residual pressure is higher than or equal to a first threshold, then considering the test of the operability of the safety valve failed;
    if the residual pressure is lower than the first threshold, then considering the test of the operability of the safety valve passed;
  wherein an original pressure occurs in the actuator of the safety valve prior to the safety event;
    wherein the residual pressure is higher than or equal to the first threshold;
  the method further comprising:
  concluding a defect in the solenoid valve if the residual pressure is lower than a second threshold;
    wherein the second threshold is greater than the first threshold and less than the original pressure;
  otherwise, concluding a defect of the positioner.

5. The method according to claim 4, further comprising:
  recording a progression of the position of the valve member and/or of the pressure, whereby a position and/or pressure and/or position-pressure characteristic curve is formed; and
  comparing the obtained characteristic curve to at least one stored reference characteristic curve.

6. The method according to claim 5, further comprising:
  obtaining statements about the operability of components of the safety valve from the comparison of the recorded progression and/or the at least one obtained characteristic curve with the at least one reference characteristic curve.

7. The method according to claim 4, further comprising:
  recording the temporal progression of the pressure and/or a first and/or second derivative thereof over time after the triggering of the safety case; and
  comparing the recorded temporal progression of the pressure and/or the first and/or second derivative thereof over time with a previously stored reference characteristic.

8. The method according to claim 4, further comprising:
  determining a first time interval which the pressure measured at the first pressure sensor requires to drop to atmospheric pressure;
  determining a second time interval which the valve member requires to move into the safety position; and
  concluding that the solenoid valve is functioning correctly if the first time interval is shorter than the second time interval.

9. The method according to claim 8, further comprising:
  concluding a defect of the solenoid valve if the first time interval is longer than the second time interval.

10. The method according to claim 4, further comprising:
  concluding a defect of the positioner from a constant pressure curve at the first pressure sensor and simultaneously a continuous position curve of the valve member.

11. The method according to claim 4, wherein a second pressure sensor is provided that measures the pressure of the drive fluid between the solenoid valve and the actuator of the safety valve;

the method further comprising:
concluding a correct functioning of the components of the safety valve if the pressure drop at the first pressure sensor is faster than the pressure drop at the second pressure sensor.

12. The method according to claim 4, wherein a second pressure sensor is provided that measures the pressure of the drive fluid between the solenoid valve and the actuator of the safety valve;
the method further comprising:
concluding a defect of the actuator of the safety valve if
the pressure drop at the first pressure sensor is faster than the pressure drop at the second pressure sensor and
the change in position of the valve member over time deviates from a reference position characteristic curve.

13. The method according to claim 4, wherein the method steps are formulated as program code with which the method can run on at least one computer.

14. A non-transitory computer-readable medium having stored thereon program instructions that upon execution by a controller cause the positioner to perform a set of steps according to method claim 4.

15. A positioner of a safety valve, the positioner having means for data recording and a controller, where the positioner is configured to check the operability of the safety valve and/or the solenoid valve;
wherein the safety valve has a valve member and, for positioning the valve member, a single-acting pneumatic actuator with a drive fluid;
wherein the safety valve has a positioner configured to adjust the pressure in the drive fluid and thereby control and/or regulate a position of the valve member;
wherein the valve member is configure to assume a safety position when the pressure in the drive fluid corresponds to an ambient pressure:
wherein a solenoid valve is pneumatically connected between the actuator and the positioner and is configured to vent the actuator to ambient;
wherein a first pressure sensor is provided that is configured to measure the pressure of the drive fluid between the positioner and the solenoid valve; and
wherein, in the event of a safety case, both the solenoid valve and the positioner are configure to vent the actuator to ambient;
wherein the actuator of the safety valve is configure to have an original pressure that occurs prior to the safety case;
wherein when a residual pressure is higher than or equal to a first threshold and the residual pressure is lower than a second threshold, the positioner is configured to conclude the solenoid valve has a defect, wherein the second threshold is greater than the first threshold and less than the original pressure; and
wherein when the residual pressure is higher than or equal to a first threshold and the residual pressure is higher than or equal to the second threshold the positioner is configured to conclude the positioner has a defect.

16. A safety valve having a positioner according to claim 15.

17. A process plant having a safety valve according to claim 16.

* * * * *